2 Sheets—Sheet 1.

H. C. HECKENDORN.
Oval Turning Lathe.

No. 201,781.  Patented March 26, 1878.

Witnesses,
Harry A. Crawford.
Harry Smith.

Inventor,
Henry C. Heckendorn
by his Attorneys
Howson and Son

2 Sheets—Sheet 2.

H. C. HECKENDORN.
Oval Turning Lathe.

No. 201,781. Patented March 26, 1878.

Witnesses,
Harry A. Crawford.
Harry Smith

Inventor,
Henry C. Heckendorn
by his Attorneys
Howson and Son

N. PETERS, PHOTO-LITHOGRAPHER, WASHINGTON, D.C.

UNITED STATES PATENT OFFICE.

HENRY C. HECKENDORN, OF READING, PENNSYLVANIA.

IMPROVEMENT IN OVAL-TURNING LATHES.

Specification forming part of Letters Patent No. 201,781, dated March 26, 1878; application filed February 4, 1878.

*To all whom it may concern:*

Be it known that I, HENRY C. HECKENDORN, of Reading, Pennsylvania, have invented a new and useful Improvement in Oval-Lathes, of which the following is a specification:

My invention relates to lathes for turning ovals, and to hat-smoothing machines in which an oval block for receiving the hat-body is used; and the objects of my invention are, first, to avoid the friction due to the guides used in an ordinary oval-lathe in connection with a rotating and reciprocating face-plate; second, to so balance, or nearly balance, the rotating and reciprocating face-plate that the lathe may be driven at a higher rate of speed than ordinary oval-lathes; and, third, to so combine the eccentric which reciprocates the face-plate and the eccentric-sleeve with an interposed adjustable annular eccentric that the lathe may be made to turn ovals of different character.

Figure 1:
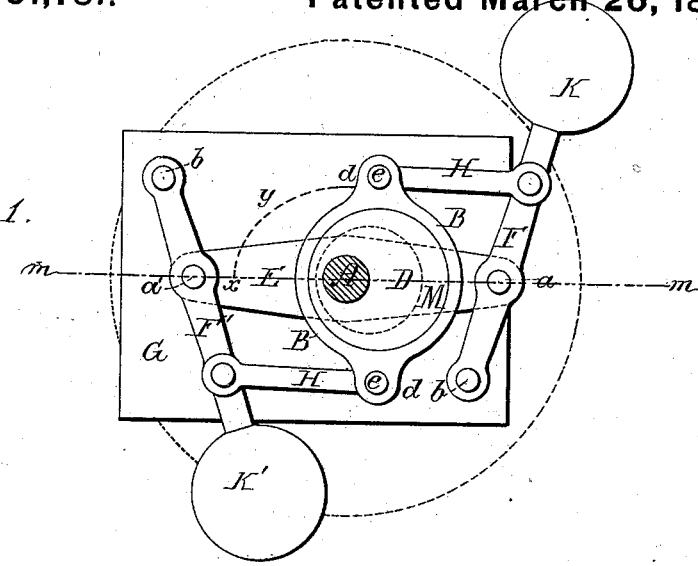
Figure 2:
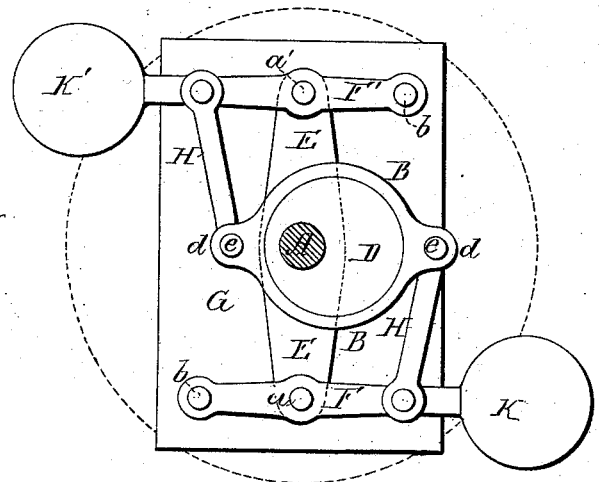
Figure 3:
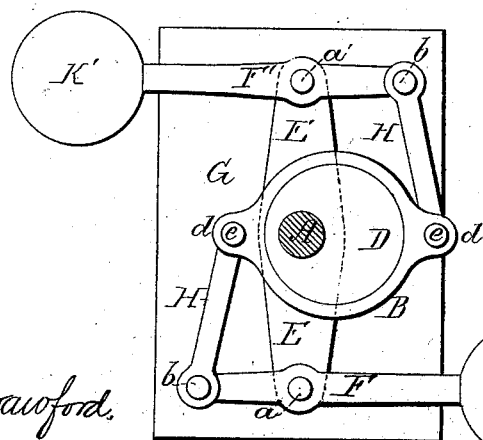
Figure 5:
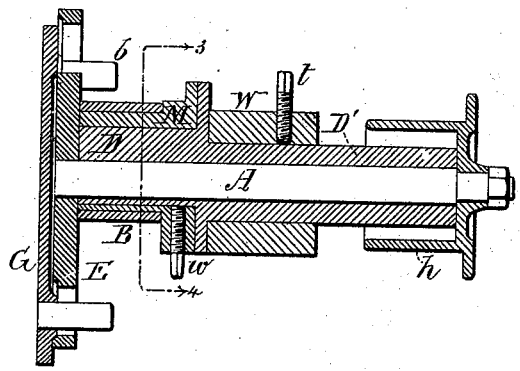
Figure 4:
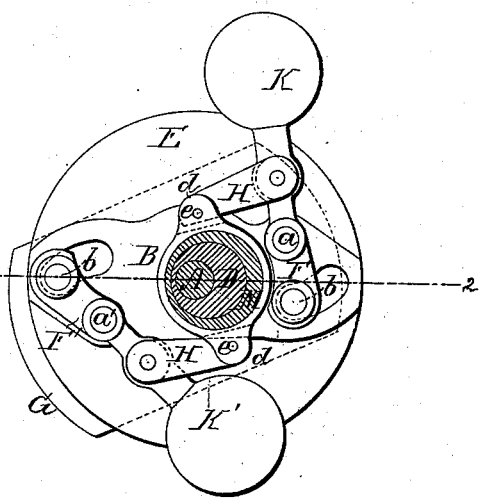
Figure 6:
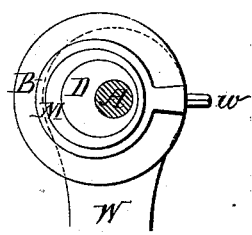

In the accompanying drawing, Figures 1 and 2, Sheet 1, are diagrams illustrating my invention; Fig. 3, a modification of the invention; Fig. 4, Sheet 2, a sectional view of the lathe; Fig. 5, a sectional plan view of Fig. 4 on the line 1 2; and Fig. 6, a transverse section on the line 3 4, Fig. 5.

A general understanding of my invention may be best acquired by reference to the diagrams, Figs. 1 and 2, Sheet 1, in which A represents a spindle, arranged to revolve in fixed bearings, and D a fixed eccentric, embraced by a sleeve, B, which can revolve freely on the said eccentric. To the spindle A is secured a carrier, consisting of a duplex arm or cross-bar, E, having two pins, $a\ a'$, one on each side of, and both at the same distance from, the center of the spindle. To the pin $a$ is pivoted a lever, F, and to the pin $a'$ is pivoted a similar lever, F', the two arms of each lever being of the same length, and one arm of each lever being connected to a pin, $b$, on the face-plate, and the other arm of each lever by a link, H, and pin $e$ to a lug, $d$, on the sleeve B of the eccentric.

Supposing the relative position of the several parts be that shown in Fig. 1, the shaft A be turned to the extent of one-fourth of a revolution—that is, to the position Fig. 2—and that a tool be applied to the face-plate—say, at a point, $x$—the curved line $y$ marked on the face-plate will be one-fourth of an oval figure, for the face-plate, controlled as it is by the eccentric, through the medium of the connection shown, must reciprocate while it rotates.

As the face-plate is carried by the pins $b\ b$, and as these pins must, during the rotation of the face-plate, move in the arcs of circles of which the pins $a\ a'$ are the centers, the face-plate will not reciprocate throughout its rotation in a course parallel with the line $m\ m$ drawn through the center of the shaft A and those of the pins $a\ a'$, and the oval described on the face-plate will not be quite uniform throughout; but for the purpose for which the lathe is mainly intended—that is, the smoothing of a hat-body fitted to a block secured to the face-plate—the course of the block will approximate closely enough to an accurate oval for practical purposes. At the same time the device has the advantage of being attended with very little friction, owing to the absence of the usual guides for insuring the parallel reciprocation of the face-plate, the latter being supported entirely by the levers F F', although in most cases I prefer a backing for the face-plate to bear against, as explained hereinafter.

Oval-lathes of the ordinary construction cannot be driven at a very high rate of speed, owing to the constantly-varying excess of weight, first on one side and then on the opposite side of the center of rotation, due to the reciprocation of the face-plate and of the load which it carries.

In order to balance, or nearly balance, the face-plate and its load, I provide the lever F with a weight, K, and the other lever, F', with a similar weight, K'.

It will be seen on reference to Fig. 1 that there is more of the face-plate G on the left of the shaft A than there is on the right of the said shaft.

It will also be seen that, viewing the two weights in connection with each other and with the center of the shaft, the weights have a preponderance on the right of the shaft, and this preponderance may, by a proper adjustment of the weights, be such as to balance the preponderance of the face-plate and its load on the opposite side of the shaft.

The eccentric controls both the face-plate and the weights, and determines their position in respect to the shaft; hence, as the preponderance of the face-plate and its load decreases on one side of the shaft, that of the weights on the opposite side of the shaft also decreases, as will be understood by comparing Fig. 1 with Fig. 2, so that no matter what the position of the face-plate in respect to the shaft may be, it will be balanced, or nearly so, by the weights, if the latter have been made or arranged in the first instance to accord with the face-plate and its load; hence the shaft and its face-plate can be driven at a speed which could not be permitted in the absence of the counter-balance. This balancing system may be adopted in connection with the guided face-plate. For instance, the plate G may be adapted to guides on the carrier E, and the holes in the levers F F', through which the pins b b pass, may be slightly elongated without any other change of other parts of the device.

Another feature of my invention may be most readily explained by reference to the diagram, Fig. 1. If the diameter of the eccentric be reduced, as shown by dotted lines, and an annular and adjustable eccentric, M, be introduced between the said reduced eccentric and the sleeve B, the extent of the reciprocation of the face-plate may be increased or diminished, according to the position to which the said annular eccentric is adjusted; hence the relation of the major in respect to the minor axis of the oval course pursued by any point on the face-plate may be changed by the adjustment of the said annular eccentric.

Referring to Sheet 2, which illustrates the detailed construction of the lathe, it will be observed that the shaft or spindle A, to one end of which is secured the carrier E, and to the other a pulley, h, is arranged to turn in a tube, D', which forms a part of the eccentric D, the said tube being so adapted to a head-stock, W, that it can be turned therein to any position desired, and secured after adjustment by a set-screw, t.

To the eccentric D is fitted the annular eccentric M, which, after adjustment, can be secured to the eccentric D by a set-screw, w, this annular eccentric being embraced by the sleeve B, which is connected, by links H H, to the two levers F F', the latter being pivoted to the carrier E, which, in the present instance, consists of a disk, forming a backing for the face-plate G to bear against.

Each lever is furnished at one end with a weight, K or K', and connected at the other end to a pin, secured to the face-plate G, and passing through a curved slot in the carrier.

The operation of the several parts has been fully set forth in the foregoing description of the diagrams in Sheet 1.

It is not essential in carrying out my invention to adhere to the precise mode described above of connecting the levers F F' to the eccentric-sleeve. For instance, the latter may be connected by links H' directly to the pins on the face-plate, to which the levers F F' are connected, as shown in the diagram, Fig. 3.

Should the pins e of the eccentric-sleeve be at unequal distances from the center of the eccentric, the figure described by applying a fixed tool to the face-plate would be what is known as an "egg-oval," and many different figures may be produced by varying the proportions of the length of the levers; in fact, any change in the relative proportion and location from that illustrated in Fig. 1 would insure a departure from a true oval.

I claim as my invention—

1. The combination, in an oval-turning lathe, of a face-plate, G, levers F F', carrying the said face-plate and carried by the rotating shaft A, and a fixed eccentric, D, for controlling the said levers, all substantially as set forth.

2. The combination of the reciprocating and rotating face-plate of an oval-lathe, the counterbalancing-weights, the eccentric to which the said face-plate owes its reciprocation, and devices whereby the said weights are placed under the control of the eccentric, all substantially as set forth.

3. The combination, in an oval-turning lathe, of the eccentric which reciprocates the face-plate, the eccentric-sleeve, connected to the said face-plate, and an annular eccentric interposed between the said eccentric and sleeve, all substantially as described.

In testimony whereof I have signed my name to this specification in the presence of two subscribing witnesses.

H. C. HECKENDORN.

Witnesses:
HARRY A. CRAWFORD,
HARRY SMITH.